US012676523B2

(12) United States Patent
Eum et al.

(10) Patent No.: US 12,676,523 B2
(45) Date of Patent: Jul. 7, 2026

(54) MAGNET FOR MOTOR AND WASHING MACHINE INCLUDING THE SAME

(71) Applicant: LG Electronics Inc., Seoul (KR)

(72) Inventors: Sangjoon Eum, Seoul (KR); Jeonghyun Cho, Seoul (KR); Songe Park, Seoul (KR); Gyujong Jeong, Seoul (KR); Kyungho Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 18/591,473

(22) Filed: Feb. 29, 2024

(65) Prior Publication Data

US 2025/0015652 A1 Jan. 9, 2025

(30) Foreign Application Priority Data

Jul. 4, 2023 (KR) ........................ 10-2023-0086341

(51) Int. Cl.
*H02K 1/27* (2022.01)
*D06F 37/30* (2020.01)
*H02K 1/2791* (2022.01)

(52) U.S. Cl.
CPC ........... *H02K 1/2791* (2022.01); *D06F 37/30* (2013.01); *H02K 2213/03* (2013.01)

(58) Field of Classification Search
CPC .......... H02K 21/12; H02K 21/02; H02K 1/14; H02K 1/2791; H02K 1/278; H02K 1/30
See application file for complete search history.

(56) References Cited

U.S. PATENT DOCUMENTS 6,717,315 B1 * 4/2004 Tajima ................... H02K 1/278
310/156.45
2020/0080246 A1 * 3/2020 Miyake ................. H02K 21/16
(Continued)

FOREIGN PATENT DOCUMENTS

JP 2012-080097 A 4/2012
KR 10-2012-0132184 A 12/2012
WO WO-2012033202 A1 * 3/2012 ............. H02K 15/03

OTHER PUBLICATIONS

WO-2012033202-A1 machine translation Oct. 18, 2025.*
(Continued)

*Primary Examiner* — Leda T Pham
(74) *Attorney, Agent, or Firm* — Fish & Richardson P.C.

(57) ABSTRACT

A magnet includes one or more polar regions each having an arc shape and arranged in a circumferential direction. A magnetic focus center of each polar region is different from a center of an inner diameter of the one or more polar regions. A value obtained by dividing (i) $d_m$, a distance from a straight line connecting ends of a first magnetic center line of the one or more polar regions to a center of the first magnetic center line, by (ii) $d_b$, a distance from a straight line connecting ends of a second magnetic center line of the one or more polar regions to a center of the second magnetic center line, satisfies certain values based on a number of the polar regions. $d_b$ is determined based on the one or more polar regions having a magnetic focus center that corresponds to the center of the inner diameter.

19 Claims, 14 Drawing Sheets

(56)          References Cited

U.S. PATENT DOCUMENTS

2022/0200408 A1      6/2022  Takahashi
2022/0263394 A1 *    8/2022  Takahashi ............... H02K 5/225

OTHER PUBLICATIONS

Extended European Search Report in European Appln. No. 24158511.
6, mailed on Oct. 4, 2024, 7 pages.
Notice of Allowance in Korean Appln. No. 10-2023-0086341,
mailed on Aug. 27, 2025, 6 pages (with English translation).

* cited by examiner

100

MAGNET FOR MOTOR AND WASHING MACHINE INCLUDING THE SAME

CROSS-REFERENCE TO RELATED APPLICATION

This application claims priority to and the benefit of Korean Patent Application No. 10-2023-0086341, filed on Jul. 4, 2023, the disclosure of which is incorporated herein by reference in its entirety.

TECHNICAL FIELD

The present disclosure relates to a magnet, a motor including the magnet, and a washing machine including the magnet. More specifically, the present disclosure relates to the magnet for improving a back electromotive force, the motor including the magnet, and the washing machine including the magnet.

BACKGROUND

In general, washing machines can include an outer tub that can contain wash water and an inner tub rotatably disposed in the outer tub to accommodate laundry such as clothes. Washing and spin-drying of the laundry can be performed as the inner tub rotates.

The washing machines can be classified as a top loading type or a front loading type. In a top loading type, a rotation center of the inner tub can be disposed in a direction perpendicular to a floor and the laundry cloth can be inserted from the top. In a front loading type, the rotation center of the inner tub can be disposed in a direction horizontal to the floor or can be inclined downward toward a back end, and the laundry cloth can be inserted from the front.

The top loading type washing machine can be classified into an agitator type and a pulsator type. The agitator type can perform the laundry by rotating a laundry rod towering in the center of the inner tub, and the pulsator type can perform the laundry by rotating a disk-shaped pulsator disposed in the lower part of the inner tub.

The front loading type is commonly referred to as a "drum washing machine," and a lifter can be disposed at an inner circumferential surface of the inner tub, and as the drum rotates, the lifter can lift and drop the laundry to perform washing.

The washing machine can operate in two main operating modes (e.g., washing mode and spin-drying mode) with different operating conditions.

To operate the washing machine with the two main operating modes, the washing machine can be provided with a clutch and can operate an output shaft at low speed and high torque with a gear ratio of n:1 (e.g., washing mode) or operate the output shaft at high speed and low torque with a gear ratio of 1:1 (e.g., spin-drying mode).

In an example, addition of a planetary gear to the washing machine can reduce power consumption and enhance operating efficiency of the motor.

In general, washing machines can be equipped with an outer rotor motor. In the outer rotor motor, a stator wound with coil can be installed inside, and a rotor can be arranged radially outside the stator as if a magnet surrounds the coil of the stator. The rotor can include a plurality of magnets that can be radially arranged.

Before magnetic material is magnetized, electrons in the magnetic material can be randomly arranged. To magnetize the magnetic material and transform it into a magnet, an electron array can be oriented within the magnetic material in a certain direction. This can be followed by a magnetization process to magnetically polarize the magnetic material by applying an external magnetic field.

A method of concentrating the magnetic flux distribution can be used to increase the magnitude of the back electromotive force based on the magnet, but cracks can occur in the magnet due to the concentration of the magnetic flux distribution.

SUMMARY

A magnet can include one or more polar regions each having an arc shape and arranged in a circumferential direction. A magnetic focus center of each of the one or more polar regions can be different from a center of an inner diameter of the one or more polar regions. A value X can be obtained by dividing (i) $d_m$, a distance from a first straight line that connects a first end and a second end of a first magnetic center line of the one or more polar regions to a center of the first magnetic center line, by (ii) $d_b$, a distance from a second straight line that connects a first end and a second end of a second magnetic center line of the one or more polar regions to a center of the second magnetic center line. The value X can satisfy at least one of following values based on a number of the one or more polar regions: X<7.5 based on the number of the one or more polar regions being 1; X<6 based on the number being 2; X<4.5 based on the number being 3; or X<3.5 based on the number being 4. $d_b$ can be determined based on the one or more polar regions having a magnetic focus center that corresponds to the center of the inner diameter.

In some implementations, $d_b$ can satisfy the following equation:

$$d_b = \frac{r_i + r_o}{2} - \sqrt{\left(\frac{r_i + r_o}{2}\right)^2 - \left(\frac{r_o - r_i}{2p}\right)^2},$$

in which $r_i$ corresponds to an inner radius of the one or more polar regions, $r_o$ corresponds to an outer radius of the one or more polar regions, and p corresponds to the number of the one or more polar regions.

In some implementations, the value X can satisfy at least one of following values based on the number of the one or more polar regions: 6<X based on the number being 1; 4.5<X based on the number being 2; 3.5<X based on the number being 3; or 2.5<X based on the number being 4.

In some implementations, the one or more polar regions can be provided in a plurality, in which distances from each magnetic focus center of each of the plurality of polar regions to each of the plurality of polar regions can be equal.

In some implementations, the one or more polar regions can be provided in a plurality, in which circumferential distances between adjacent magnetic focus centers of the plurality of polar regions can be equal.

In some implementations, the one or more polar regions can be provided in a plurality, in which neighboring polar regions of the plurality of polar regions can have different polarities.

A magnet can include one or more polar regions each having an arc shape and arranged in a circumferential direction. A magnetic focus center of each of the one or more polar regions can be different from a center of an inner diameter of the one or more polar regions. A value X can be obtained by dividing (i) $d_m$, a distance from a first straight line that connects a first end and a second end of a first magnetic center line of the one or more polar regions to a center of the first magnetic center line, by (ii) $d_b$, a distance from a second straight line that connects a first end and a second end of a second magnetic center line of the one or more polar regions to a center of the second magnetic center line. The value X can satisfy at least one of following values based on a number of the one or more polar regions: 6<X based on the number of the one or more polar regions being 1; 4.5<X based on the number being 2; 3.5<X based on the number being 3; or 2.5<X based on the number being 4. $d_b$ can be determined based on the one or more polar regions having a magnetic focus center that corresponds to the center of the inner diameter.

In some implementations, $d_b$ can satisfy the following equation:

$$d_b = \frac{r_i + r_o}{2} - \sqrt{\left(\frac{r_i + r_o}{2}\right)^2 - \left(\frac{r_o - r_i}{2p}\right)^2},$$

in which $r_i$ corresponds to an inner radius of the one or more polar regions, $r_o$ corresponds to an outer radius of the one or more polar regions, and p corresponds to the number of the one or more polar regions.

In some implementations, the one or more polar regions can be provided in a plurality, in which distances from each magnetic focus center of each of the plurality of polar regions to each of the plurality of polar regions can be equal.

In some implementations, the one or more polar regions can be provided in a plurality, in which circumferential distances between adjacent magnetic focus centers of the plurality of polar regions can be equal.

In some implementations, the one or more polar regions can be provided in a plurality, in which neighboring polar regions of the plurality of polar regions can have different polarities.

A motor can include a stator, a rotor that includes a rotor core disposed radially outside the stator, and a plurality of magnets that are disposed on an inner surface of the rotor core and that face the stator. Each of the plurality of magnets can include one or more polar regions each having an arc shape and arranged in a circumferential direction. A magnetic focus center of each of the one or more polar regions can be different from a center of an inner diameter of the one or more polar regions.

In some implementations, based on a number of the one or more polar regions being 1, a number of the plurality of magnets can be 48. In some implementations, based on the number of the one or more polar regions being 2, the number of the plurality of magnets can be 24. In some implementations, based on the number of the one or more polar regions being 3, the number of the plurality of magnets can be 16. In some implementations, based on the number of the one or more polar regions being 4, the number of the plurality of magnets can be 12.

A washing machine can include a motor. The motor can include a stator, a rotor that includes a rotor core disposed radially outside the stator, and a plurality of magnets that are disposed on an inner surface of the rotor core and that face the stator. Each of the plurality of magnets can include one or more polar regions each having an arc shape and arranged in a circumferential direction. A magnetic focus center of each of the one or more polar regions can be different from a center of an inner diameter of the one or more polar regions.

In some implementations, a value X can be obtained by dividing (i) $d_m$, a distance from a first straight line that connects a first end and a second end of a first magnetic center line of the one or more polar regions to a center of the first magnetic center line, by (ii) $d_b$, a distance from a second straight line that connects a first end and a second end of a second magnetic center line of the one or more polar regions to a center of the second magnetic center line. The value X can satisfy at least one of following values based on a number of the one or more polar regions: X<7.5 based on the number of the one or more polar regions being 1; X<6 based on the number being 2; X<4.5 based on the number being 3; or X<3.5 based on the number being 4. $d_b$ can be determined based on the one or more polar regions having a magnetic focus center that corresponds to the center of the inner diameter.

In some implementations, $d_b$ can satisfy the following equation:

$$d_b = \frac{r_i + r_o}{2} - \sqrt{\left(\frac{r_i + r_o}{2}\right)^2 - \left(\frac{r_o - r_i}{2p}\right)^2},$$

in which $r_i$ corresponds to an inner radius of the one or more polar regions, $r_o$ corresponds to an outer radius of the one or more polar regions, and p corresponds to the number of the one or more polar regions.

In some implementations, the value X can satisfy at least one of following values based on the number of the one or more polar regions: 6<X<7.5 based on the number being 1; 4.5<X<6 based on the number being 2; 3.5<X<4.5 based on the number being 3; or 2.5<X<3.5 based on the number being 4.

In some implementations, the one or more polar regions can be provided in a plurality, in which distances from each magnetic focus center of each of the plurality of polar regions to each of the plurality of polar regions can be equal.

In some implementations, the one or more polar regions can be provided in a plurality, in which circumferential distances between adjacent magnetic focus centers of the plurality of polar regions can be equal.

In some implementations, the stator can include a plurality of stator teeth and the plurality of magnets that are disposed on an inner surface of the rotor core can face the plurality of stator teeth.

DETAILED DESCRIPTION

Figure 1:
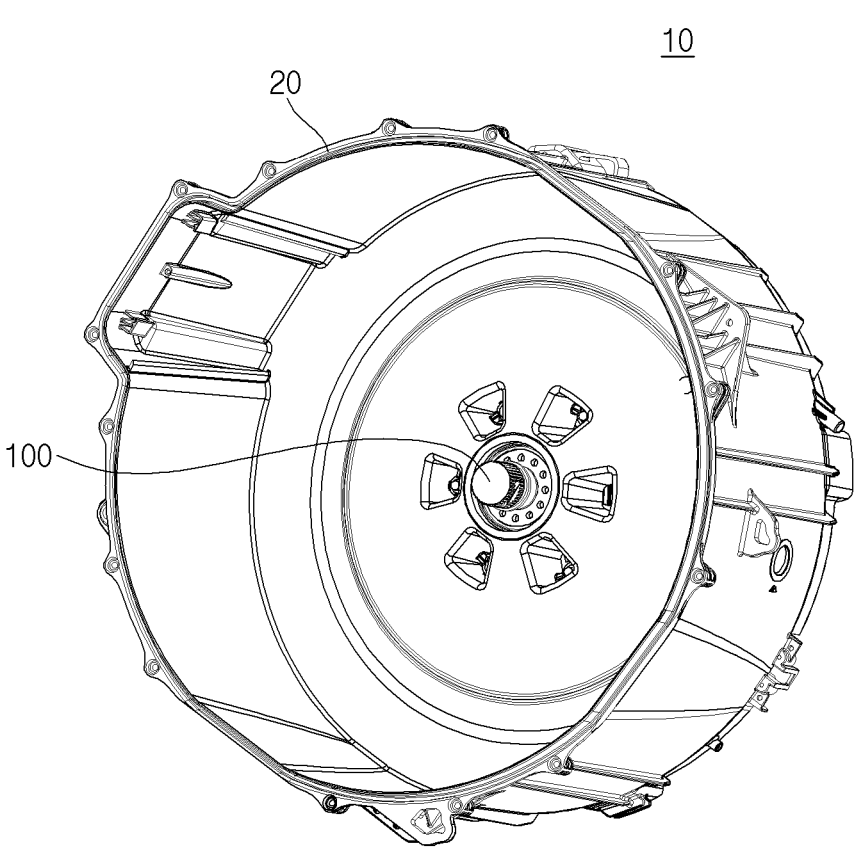
FIGS. 1 and 2 are diagrams illustrating examples of a washing machine.
Figure 2:
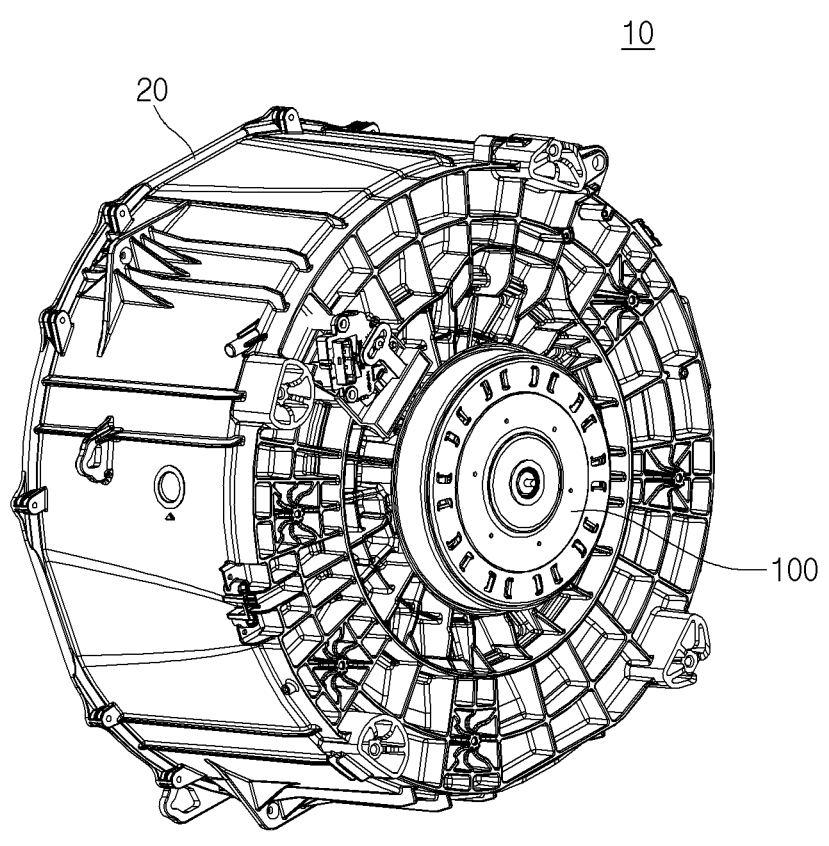

FIGS. 1 and 2 are diagram illustrating examples of perspective views of a washing machine.

Referring to FIGS. 1 and 2, a washing machine 10 can include an outer tub 20 and a washing machine driving system 100.

The washing machine 10 will be described using a front loading type design so that a rotation center of an inner tub can be formed in a direction horizontal relative to the floor or can be inclined downward toward a back end and the laundry (e.g., laundry items) can be inserted from the front as an example, but the detailed configuration of the washing machine driving system 100 can also be applied to a top loading type washing machine.

The outer tub 20 can have a cylindrical shape with an open top or an open front portion. An inner tub can be disposed inside the outer tub 20. The outer tub 20 can be made of plastic material. The inner tub can be connected to an output shaft 110 of the washing machine driving system 100. The washing machine driving system 100 can be coupled to the inner tub of the washing machine 10 and can rotate the inner tub.

Figure 3:
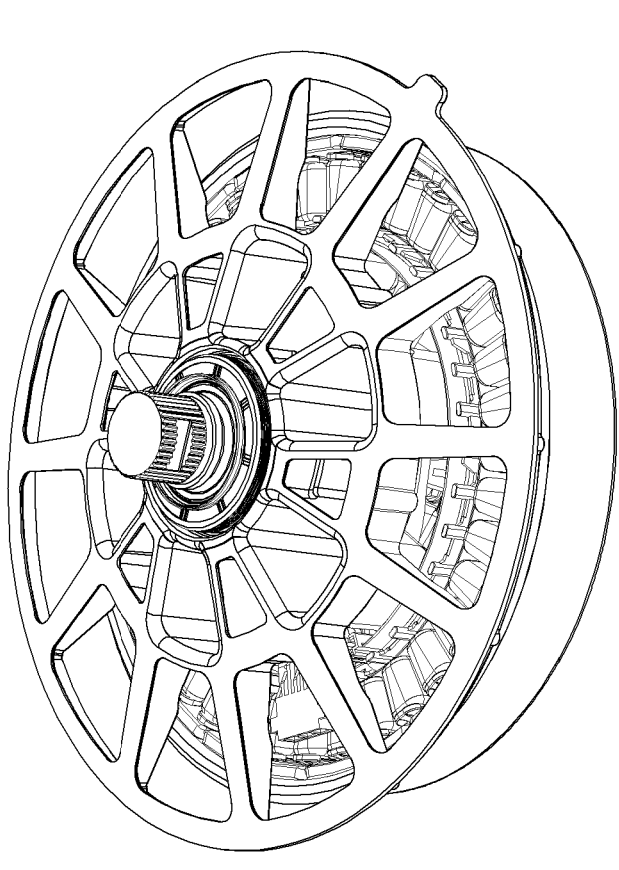
FIG. 3 is a diagram illustrating an example of a washing machine driving system.
Figure 4:
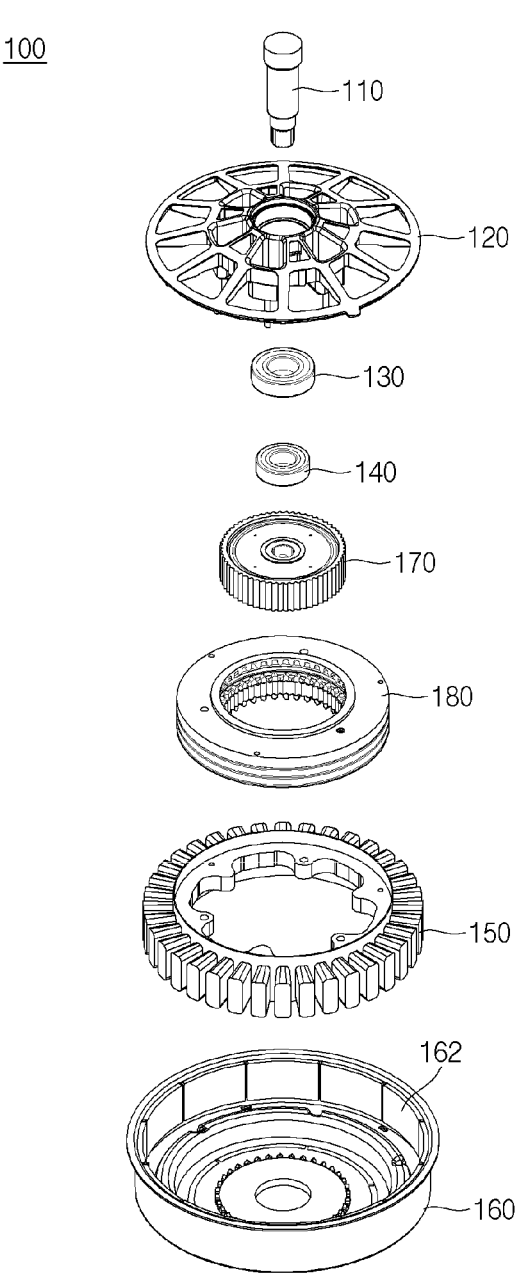
FIG. 4 is a diagram illustrating an exploded perspective view of an example of a washing machine driving system.
Figure 5:
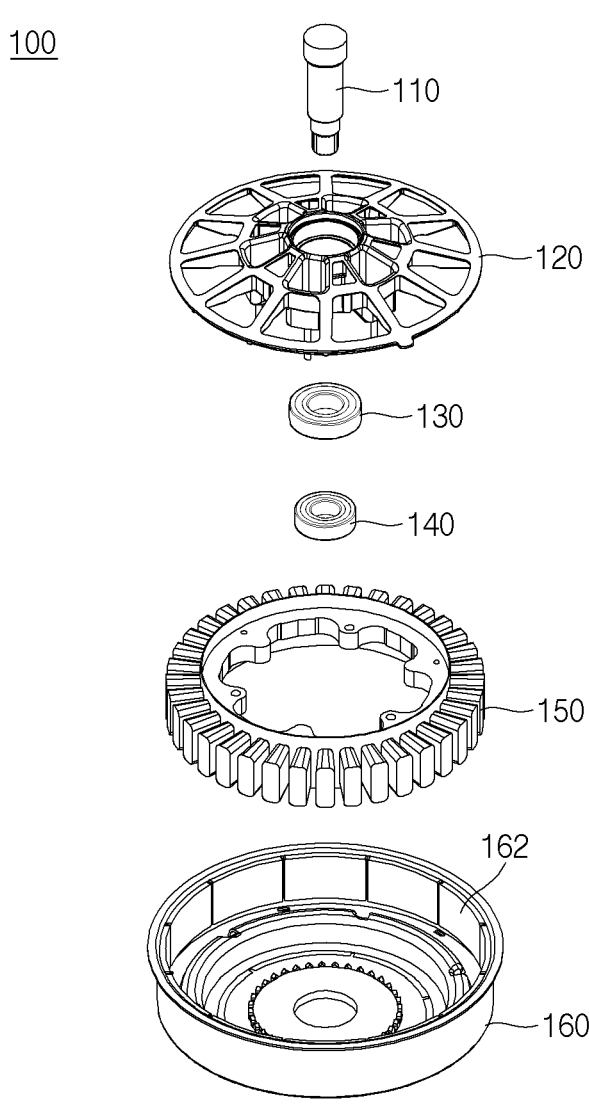
FIG. 5 is a diagram illustrating an exploded perspective view of an example of a washing machine driving system.
Figure 6:
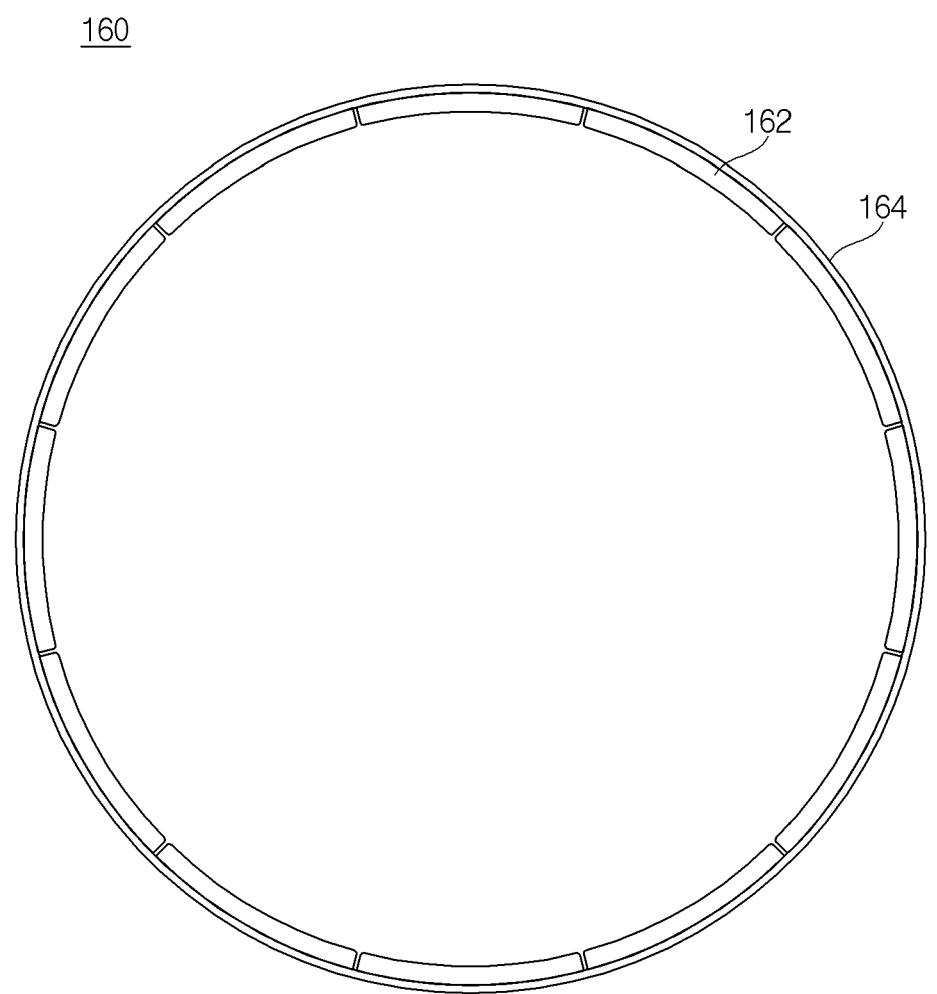
FIG. 6 is a diagram illustrating a plain view of an example of a rotor.

FIG. 3 is a diagram illustrating an example of a washing machine driving system. FIG. 4 is a diagram illustrating an exploded perspective view of an example of a washing machine driving system. FIG. 5 is a diagram illustrating an exploded perspective view of an example of a washing machine driving system. FIG. 6 is a diagram illustrating a plain view of an example of a rotor.

Referring to FIGS. 3, 4, and 6, a washing machine driving system 100 can include an output shaft 110, a housing 120, a first bearing 130, a second bearing 140, a stator 150, a rotor 160, a planetary gear set 170, and a clutch 180, but the washing machine driving system 100 can be implemented excluding some of these configurations, and additional configurations other than these are not excluded.

As shown in FIG. 5, the washing machine driving system 100 can be implemented excluding the planetary gear set 170 and the clutch 180.

The output shaft 110 can extend in an axial direction. The output shaft 110 can be coupled to the inner tub. The output shaft 110 can be rotatably coupled to the housing 120. The output shaft 110 can be coupled to the housing 120. The output shaft 110 can be coupled to the planetary gear set 170.

The inner tub can be coupled to an upper region of the output shaft 110. A central region of the output shaft 110 can be coupled to the housing 120 using one or more bearings. The first bearing 130 and the second bearing 140 can be disposed between the central region of the output shaft 110 and the housing 120.

A lower region of the output shaft 110 can be disposed within the rotor 160. The lower region of the output shaft 110 can be coupled to the planetary gear set 170. A diameter of the lower region of the output shaft 110 can be less than a diameter of the central region. An axial length of the lower region of the output shaft 110 can be less than an axial length of the central region of the output shaft 110.

The output shaft 110 can be rotatably coupled to the housing 120. The inner tub and the outer tub 20 can be disposed on an upper portion of the housing 120. The housing 120 can be coupled to the outer tub 20. The stator 150, the rotor 160, the planetary gear set 170, and the clutch 180 can be disposed in the lower portion of the housing 120. The housing 120 can be coupled to the stator 150. The housing 120 can be made of plastic material.

The first bearing 130 can be disposed between the output shaft 110 and the housing 120. The first bearing 130 can be used to couple the output shaft 110 to the housing 120. The first bearing 130 can be used to rotatably couple the output shaft 110 to the housing 120. The first bearing 130 can extend in a circumferential direction. The first bearing 130 can be disposed on the second bearing 140.

The second bearing 140 can be disposed between the output shaft 110 and the housing 120. The second bearing 140 can be used to couple the output shaft 110 to the housing 120. The second bearing 140 can be used to rotatably couple the output shaft 110 to the housing 120. The second bearing 140 can extend in the circumferential direction. The second bearing 140 can be disposed below the first bearing 130. The second bearing 140 can be disposed on the planetary gear set 170. The second bearing 140 can be disposed radially inside the stator 150.

The stator 150 can be coupled to the housing 120. The stator 150 can be disposed inside the rotor 160. The stator 150 can face the rotor 160. The stator 150 can be disposed on the clutch 180. The stator 150 can include a coupling portion coupled to the housing 120, a stator unit (e.g., stator tooth) disposed radially outside the coupling portion, and a coil wound around the stator unit. The stator 150 can rotate the rotor 160 through electromagnetic interaction.

The rotor 160 can face the stator 150. The rotor 160 can be coupled to the planetary gear set 170. Based on the rotor 160 being coupled to the planetary gear set 170, the rotor 160 can supply rotational force to the output shaft 110.

The rotor 160 can include a rotor core 164 disposed on an outer radial side of the stator 150, and a magnet 162 disposed on an inner surface of the rotor core 164. The magnet 162 can face the stator 150. The magnet 162 can face one or more stator units (e.g., stator tooth) of the stator 150. When electrical current is supplied to the coil of the stator 150, the magnet 162 can rotate in one direction or the other direction due to electromagnetic interaction.

The magnet 162 may include a plurality of magnets 162 spaced apart in the circumferential direction. The plurality of magnets 162 can be spaced apart along the inner surface of the rotor core 164. The plurality of magnets 162 can be disposed radially with respect to a central region of the rotor core 164. Each of the plurality of magnets 162 can face a plurality of stator units spaced apart in the circumferential direction.

The stator 150 and the rotor 160 can be referred to as a "motor."

The planetary gear set 170 can be spline-coupled to an outer circumferential surface of the output shaft 110. The planetary gear set 170 can be coupled to the rotor 160. The planetary gear set 170 can rotate integrally with the rotor 160. The planetary gear set 170 can transmit the rotational force of the rotor 160 to the output shaft 110.

For example, the planetary gear set 170 can transmit the rotational force of the rotor 160 to the output shaft 110 at a gear ratio of 1:1 or at a reduced the speed (e.g., at a gear ratio of n:1). In another example, a gear ratio can be reduced to 1:1 and the planetary gear set 170 can transmit the rotational force of the rotor 160 to the output shaft at such gear ratio of 1:1. Based on this variability, the washing mode and spin-drying mode can be implemented without stopping between the end of washing and the start of spin-drying.

The clutch 180 can be disposed between the motors 150 and 160 and the planetary gear set 170. A first portion of the clutch 180 can be spline-coupled to the planetary gear set 170, and a second portion of the clutch 180 can be coupled to the stator 150. The clutch 180 can engage (e.g., fix) or disengage one or more components of the planetary gear set 170. Based on this feature (e.g., engagement or disengagement), the clutch 180 can allow the planetary gear set 170 to transmit the rotational force of the rotor 160 to the output shaft 110 at the gear ratio of 1:1. For example, the gear ratio can be reduced to 1:1 and the planetary gear set 170 can transmit the rotational force of the rotor 160 to the output shaft 110 at the gear ratio of 1:1.

FIGS. 7 to 10 are diagrams illustrating plain views of an example of a magnet. FIG. 11 is a diagram illustrating a plain view of an example of a rotor. FIG. 12 is a diagram illustrating an enlarged view of portion A of FIG. 11.

In some implementations, the magnet 162 can be used in the washing machine 10 without the planetary gear set 170 and the clutch 180, as shown in FIG. 5.

Figure 7:
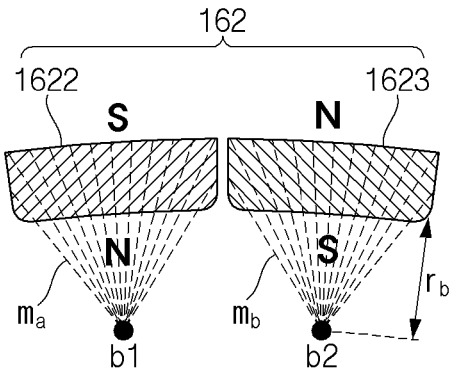
FIGS. 7 to 10 are diagrams illustrating plain views of an example of a magnet.

Referring to FIG. 7, the magnet 162 can include single polar regions 1622 and 1623. The single polar regions 1622 and 1623 can be spaced apart in the circumferential direction. The single polar regions 1622 and 1623 can be arranged side by side in the circumferential direction. The single polar regions 1622 and 1623 that are disposed adjacent to each other can have different polarities. For example, an inner surface of a first polar region 1622 can have a North (N) pole. For example, an inner surface of a second polar region 1623, which is spaced apart from the first polar region 1622 in the circumferential direction, can have a South(S) pole.

The single polar regions 1622 and 1623 can together form an arc shape. The adjacent single polar regions 1622 and 1623 each can have magnetic focus centers b1 and b2, respectively, that are different from a center O of an inner diameter r-i of the single polar regions 1622 and 1623. For example, a first magnetic focus center b1 can be a focus center of a first magnetic orientation ($m_a$) of the first polar region 1622 and a second magnetic focus center b2 can be a focus center of a second magnetic orientation ($m_b$) of the second polar region 1623. A distance ($r_b$) between the magnetic focus center b1 and the single polar region 1622 can be equal to a distance between the magnetic focus center b2 and the single polar region 1623.

In some implementations, the magnet 162 being formed based on the single polar regions 1622 and 1623 can be defined as a "one-pole magnet."

Figure 8:
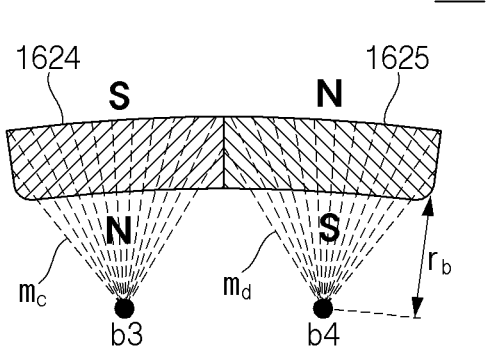

Referring to FIG. 8, the magnet 162 can include two polar regions 1624 and 1625. The two polar regions 1624 and 1625 can be arranged side by side in the circumferential direction. The two polar regions 1624 and 1625 can have different polarities. For example, an inner surface of the third polar region 1624 can have a N pole, and an inner surface of the fourth polar region 1625 can have a S pole.

The two polar regions 1624 and 1625 can together form an arc shape. The adjacent two polar regions 1624 and 1625 can each have magnetic focus centers b3 and b4, respectively, that are different from a center O of an inner diameter r-i of the two polar regions 1624 and 1625. For example, a third magnetic focus center b3 can be a focus center of a third magnetic orientation ($m_c$) of the third polar region 1624, and a fourth magnetic focus center b4 can be a focus center of a fourth magnetic orientation ($m_d$) of the fourth polar region 1625. A distance ($r_b$) between the magnetic focus center b3 and the third polar region 1624 can be equal to a distance between the magnetic focus center b4 and the fourth polar region 1625.

In some implementations, the magnet 162 being formed based on the two polar regions 1624 and 1625 can be defined as a "two-pole magnet."

Figure 9:
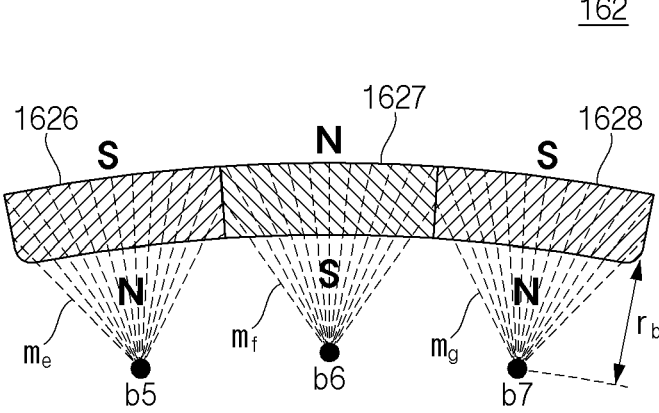

Referring to FIG. 9, the magnet 162 can include three polar regions 1626, 1627, and 1628. The three polar regions 1626, 1627, and 1628 can be arranged side by side in the circumferential direction. The three polar regions 1626, 1627, and 1628 can have different polarities. For example, an inner surface of the fifth polar region 1626 can have a N pole, and an inner surface of the sixth polar region 1627 can have a S pole, and an inner surface of the seventh polar region 1628 can have a N pole.

The three polar regions 1626, 1627, and 1628 can be formed into an arc shape. The adjacent three polar regions 1626, 1627, and 1628 can each have magnetic focus centers b5, b6, and b7, respectively, that are different from a center O of an inner diameter r-i of the three polar regions 1626, 1627, and 1628. For example, a fifth magnetic focus center b5 can be a focus center of a fifth magnetic orientation ($m_e$) of the fifth polar region 1626, a sixth magnetic focus center b6 can be a focus center of a sixth magnetic orientation ($m_f$) of the sixth polar region 1627, and a seventh magnetic focus center b7 can be a focus center of a seventh magnetic orientation ($m_g$) of the seventh polar region 1628. Distances $r_b$ between the magnetic focus centers b5, b6, and b7 of the three polar regions 1626, 1627, and 1628 and the three polar regions 1626, 1627, and 1628 can be equal to each other. The circumferential distances between the magnetic focus centers b5, b6, and b7 of the three polar regions 1626, 1627, and 1628 and adjacent magnetic focus centers can be equal to each other.

In some implementations, the magnet 162 being formed based on the three polar regions 1626, 1627, and 1628 can be defined as a "three-pole magnet."

Figure 10:
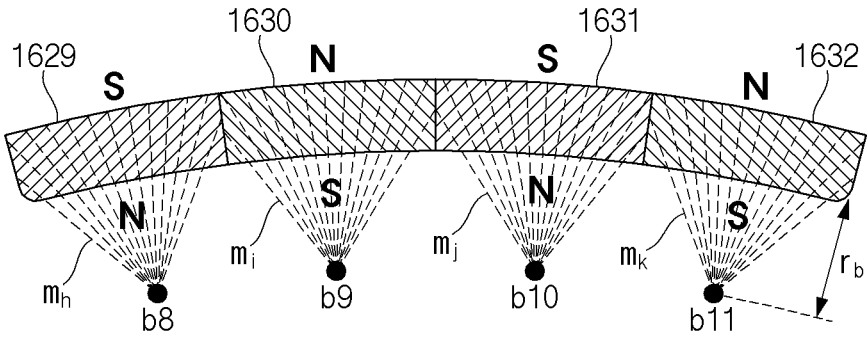
Figure 11:
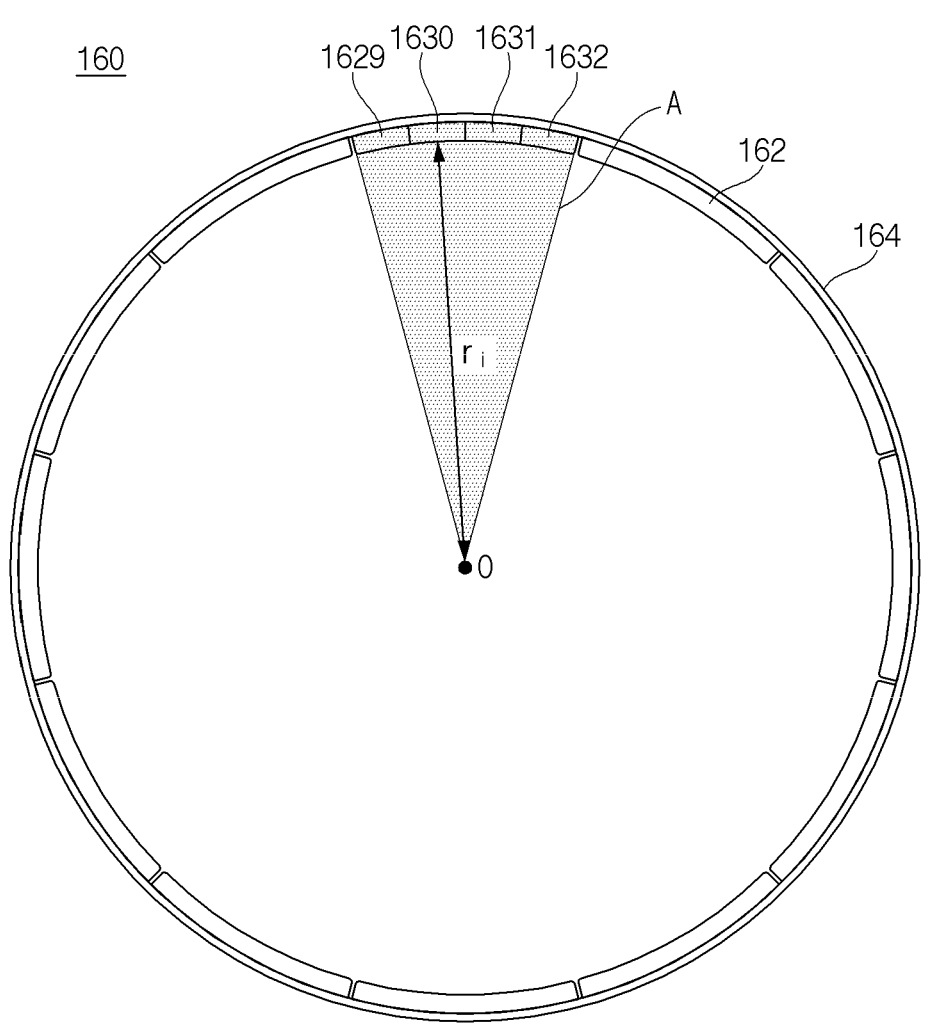
FIG. 11 is a diagram illustrating a plain view of an example of a rotor.
Figure 12:
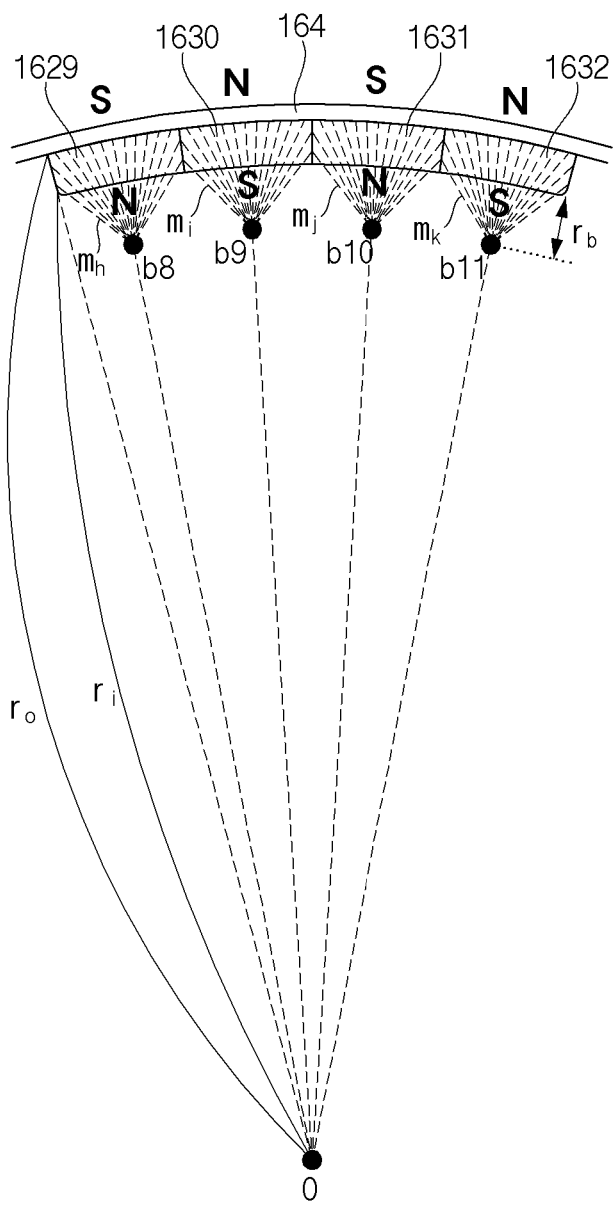
FIG. 12 is a diagram illustrating an enlarged view of portion A of FIG. 11.

Referring to FIGS. 10 to 12, the magnet 162 can include four polar regions 1629, 1630, 1631, and 1632. The four polar regions 1629, 1630, 1631, and 1632 can be arranged side by side in the circumferential direction. The four polar regions 1629, 1630, 1631, and 1632 can have different polarities. For example, an inner surface of the eighth polar region 1629 can have a N pole, and an inner surface of the ninth polar region 1630 can have a S pole, an inner surface of the tenth polar region 1631 can have a N pole, an inner surface of the eleventh polar region 1632 can have a S pole. The four polar regions 1629, 1630, 1631, and 1632 can together form an arc shape.

The adjacent four polar regions 1629, 1630, 1631, and 1632 each can have magnetic focus centers b8, b9, b10, and b11, respectively, that are different from a center O of an inner diameter r-i of the four polar regions 1629, 1630, 1631, and 1632. For example, an eighth magnetic focus center b8 can be a focus center of an eighth magnetic orientation ($m_h$) of the eighth polar region 1629, a ninth magnetic focus center b9 can be a focus center of a ninth magnetic orientation ($m_i$) of the ninth polar region 1630, a tenth magnetic focus center b10 can be a focus center of a tenth magnetic orientation ($m_j$) of the tenth polar region 1631, and an eleventh magnetic focus center b11 can be a focus center of an eleventh magnetic orientation ($m_k$) of the eleventh polar region 1632.

In this case, the distances $r_o$ between the magnetic focus centers b8, b9, b10, and b11 of the four polar regions 1629, 1630, 1631, and 1632 and the four polar regions 1629, 1630, 1631, and 1632 can be equal to each other. The circumferential distances between the magnetic focus centers b8, b9, b10, and b11 of the four polar regions 1629, 1630, 1631, and 1632 and adjacent magnetic focusing centers can be equal to each other.

In some implementations, the magnet 162 being formed based on the four polar regions 1629, 1630, 1631, and 1632 can be defined as a "four-pole magnet."

In some implementations, when one-pole magnet is formed, a number of the plurality of magnets 162 spaced apart in the circumferential direction (e.g., along the stator core) can be 48. When two-pole magnet is formed, a number of the plurality of magnets 162 spaced apart in the circumferential direction (e.g., along the inner surface of the rotor core 164) can be 24. When three-pole magnet is formed, a number of the plurality of magnets 162 spaced apart in the circumferential direction can be 16. When four-pole magnet is formed, a number of the plurality of magnets 162 spaced apart in the circumferential direction can be 12.

Based on different types of magnets (e.g., magnets with different number of polar regions) and arrangement of such magnets, space efficiency of the motors 150 and 160 of the washing machine 10 can be improved.

Even though the examples are described with respect to 1-4 polar regions of a respective magnet (e.g., one-pole magnet, two-pole magnet, three-pole magnet, four-pole magnet), different arrangement can be made based on the magnet having more than 4 polar regions (e.g., five-pole magnet, six-pole magnet, etc.).

Figure 13:
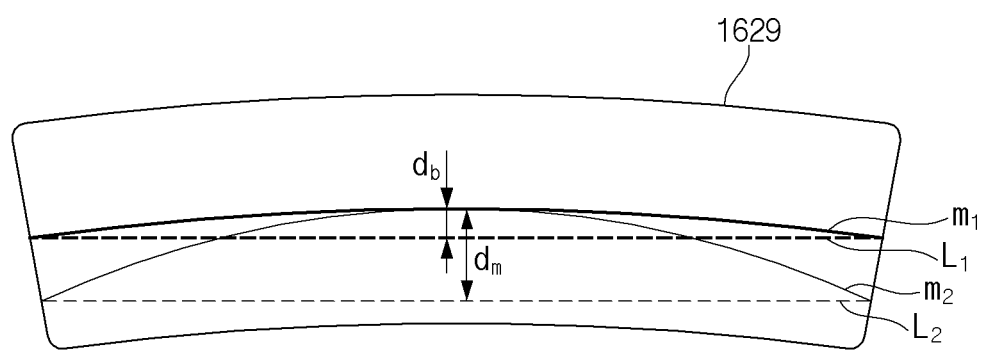
FIG. 13 is a diagram illustrating a plain view of an example of a polar region.

FIG. 13 is a diagram illustrating a plain view of an example of a polar region.

The polar anisotropy coefficient (X) will be described with reference to FIG. 13.

$d_m$ can correspond to a distance from a straight line ($L_2$) connecting both ends of a magnetic center line ($m_2$) of the at least one polar region (1622, 1623, 1624, 1625, 1626, 1627, 1628, 1629, 1630, 1631, 1632) to a central region of the magnetic center line ($m_2$) of the at least one polar region (1622, 1623, 1624, 1625, 1626, 1627, 1628, 1629, 1630, 1631, 1632).

$d_b$ can correspond to a distance from a straight line ($L_1$) connecting both ends of a magnetic center line ($m_1$) of the at least one polar region (1622, 1623, 1624, 1625, 1626, 1627, 1628, 1629, 1630, 1631, 1632) to a central region of the magnetic center line ($m_1$) of the at least one polar region (1622, 1623, 1624, 1625, 1626, 1627, 1628, 1629, 1630, 1631, 1632) when the at least one polar region (1622, 1623, 1624, 1625, 1626, 1627, 1628, 1629, 1630, 1631, 1632) has a magnetic focus center that is equal to the center (O) of the inner diameter (r-i) of the at least one polar region (1622, 1623, 1624, 1625, 1626, 1627, 1628, 1629, 1630, 1631, 1632).

In FIG. 13, $d_m$ and de are illustrated based on vertical lines (with arrows) spaced left and right. In some implementations, since $d_m$ and $d_b$ are measured from to the central regions of the magnetic center lines ($m_2$, $m_1$) respectively, vertical lines (with arrows) shown to be spaced left and right in FIG. 13 can overlap with each other in reality, and $d_m$ and $d_b$ can correspond to lengths based on such vertical lines.

For example, $d_b$ can be expressed in a form of below Equation (1).

$$d_b = \frac{r_i + r_o}{2} - \sqrt{\left(\frac{r_i + r_o}{2}\right)^2 - \left(\frac{r_o - r_i}{2p}\right)^2} \qquad \text{Equation (1)}$$

The $r_i$ can correspond to an inner radius of the at least one polar region (1622, 1623, 1624, 1625, 1626, 1627, 1628, 1629, 1630, 1631, 1632), $r_o$ can correspond to an outer radius of the at least one polar region (1622, 1623, 1624, 1625, 1626, 1627, 1628, 1629, 1630, 1631, 1632), and p can correspond to the number of the at least one polar region (1622, 1623, 1624, 1625, 1626, 1627, 1628, 1629, 1630, 1631, 1632).

The polar anisotropy coefficient (X) is a coefficient that determines how close the magnetic focus center of the at least one polar region (1622, 1623, 1624, 1625, 1626, 1627, 1628, 1629, 1630, 1631, 1632) is located to the at least one polar region (1622, 1623, 1624, 1625, 1626, 1627, 1628, 1629, 1630, 1631, 1632). For example, the polar anisotropy coefficient (X) can be expressed in a form of below Equation 2.

$$X = \frac{d_m}{d_b} \qquad \text{Equation (2)}$$

Figure 14:
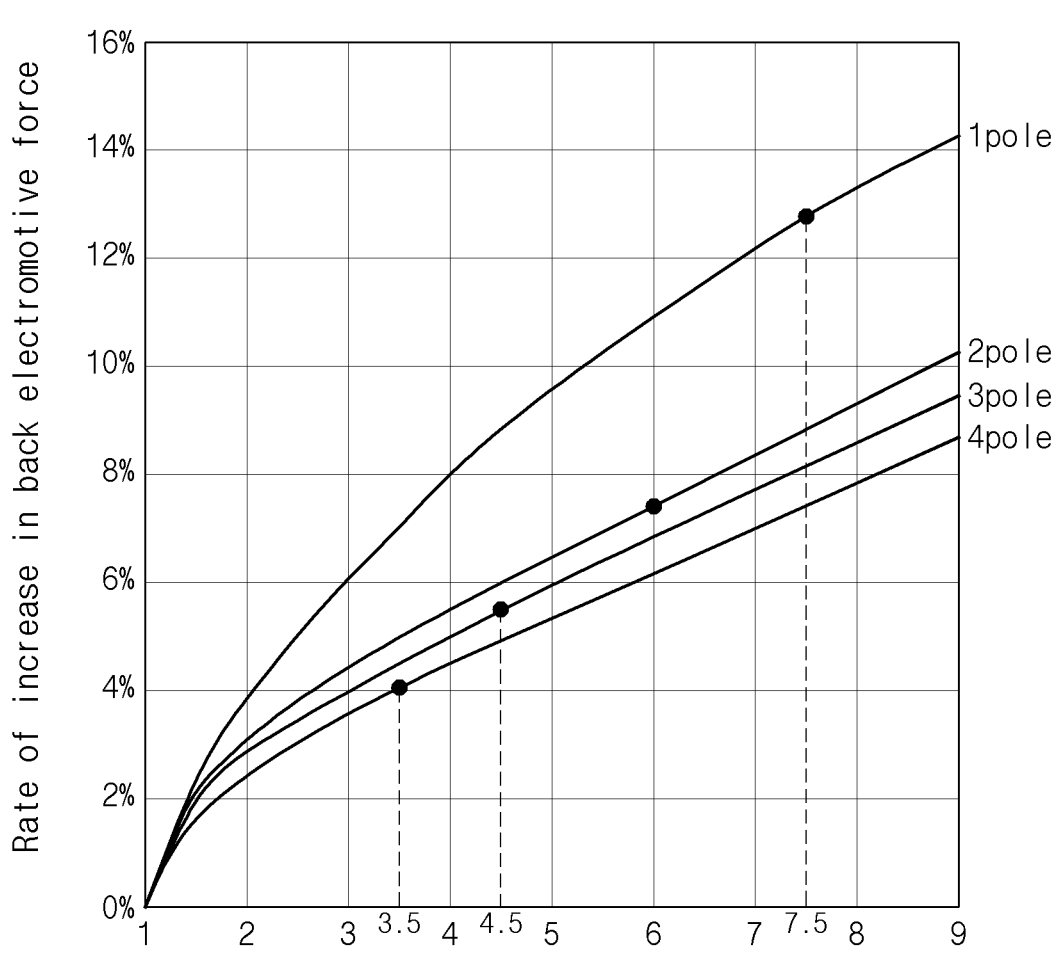
FIG. 14 is a graph illustrating a rate of increase in back electromotive force of an example of a motor with respect to a polar anisotropy coefficient of an example of a magnet.

FIG. 14 is a graph illustrating a rate of increase in back electromotive force of an example of a motor with respect to a polar anisotropy coefficient of an example of a magnet.

Referring to FIG. 14, the rate of increase in back electromotive force is illustrated with respect to the polar anisotropy coefficient (X) of the magnet 162. As the polar anisotropy coefficient (X) of the magnet 162 increases, the rate of increase in back electromotive force of the motors 150 and 160 increases. Here, the rate of increase in back electromotive force refers to a ratio of the back electromotive force when the polar anisotropy coefficient changes compared to the back electromotive force when the polar anisotropy coefficient (X) is 1. The closer the magnetic focus center (b1, b2, b3, b4, b5, b6, b7, b8, b9, b10, b11) of the at least one polar region (1622, 1623, 1624, 1625, 1626, 1627, 1628, 1629, 1630, 1631, 1632) approaches the at least one polar region (1622, 1623, 1624, 1625, 1626, 1627, 1628, 1629, 1630, 1631, 1632), the higher the polar anisotropy coefficient (X) can be.

As the polar anisotropy coefficient (X) increases, the orientation lines (indicating electron arrangement of magnetic material) converge toward the circumferential center of the polar region, since as the rigidity of both ends in the circumferential direction of the polar region weakens, cracks can occur in the magnet 162. That is, when the polar anisotropy coefficient (X) continues to increase, cracks can occur in the magnet 162.

Specifically, if the magnet 162 is a 1-pole magnet, cracks can occur in the magnet 162 when the polar anisotropy coefficient (X) reaches 7.5. If the magnet 162 is a 2-pole magnet, cracks can occur in the magnet 162 when the polar anisotropy coefficient (X) reaches 6. If the magnet 162 is a 3-pole magnet, cracks can occur in the magnet 162 when the polar anisotropy coefficient (X) reaches 4.5. If the magnet 162 is a 4-pole magnet, cracks can occur in the magnet 162 when the polar anisotropy coefficient (X) reaches 3.5.

Therefore, when the number of the at least one polar region 1622 or 1623 of the magnet 162 is 1, it can be preferable that the polar anisotropy coefficient (X) be less than 7.5. When the number of the at least one of the polar regions 1624 and 1625 is 2, it can preferable that the polar anisotropy coefficient (X) be less than 6. When the number of the at least one polar regions 1626, 1627, and 1628 is 3, it can be preferable that the polar anisotropy coefficient (X) be less than 4.5. When the number of the at least four polar regions 1629, 1630, 1631, and 1632 is 4, it can be preferable that the polar anisotropy coefficient (X) be less than 3.5.

Therefore, damage to the product can be diminished by reducing the possibility of cracks occurring in the magnet 162 while increasing the back electromotive force of the motors 150 and 160.

Figure 15:
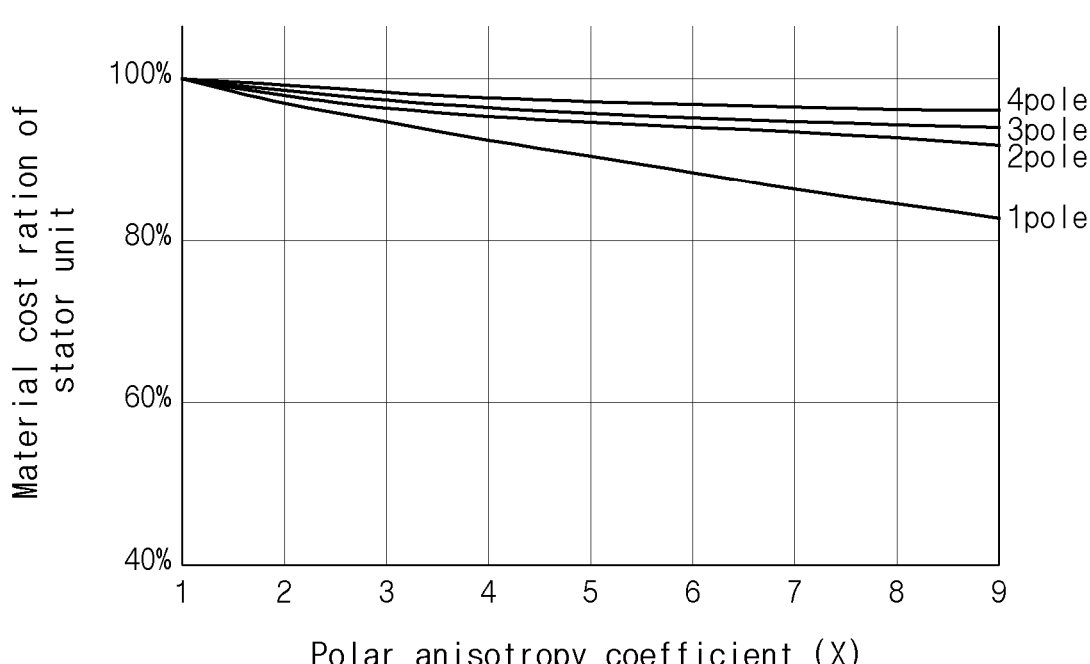
FIG. 15 is a graph illustrating a rate of change of material cost of an example of a stator unit with respect to a polar anisotropy coefficient of an example of a magnet.
Figure 16:
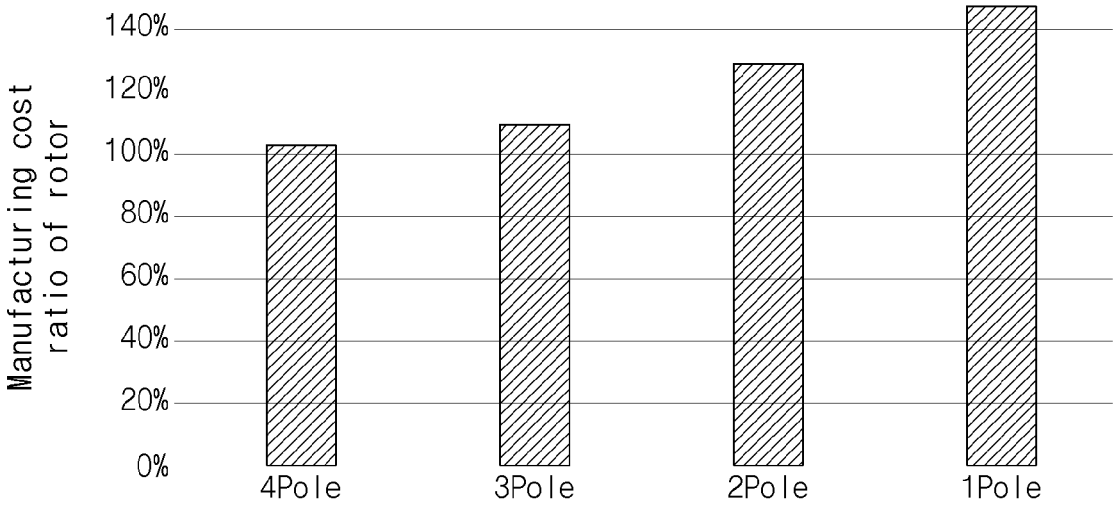
FIG. 16 is a graph illustrating a manufacturing cost ratio of an example of a rotor with respect to the number of polar regions in an example of one magnet.
Figure 17:
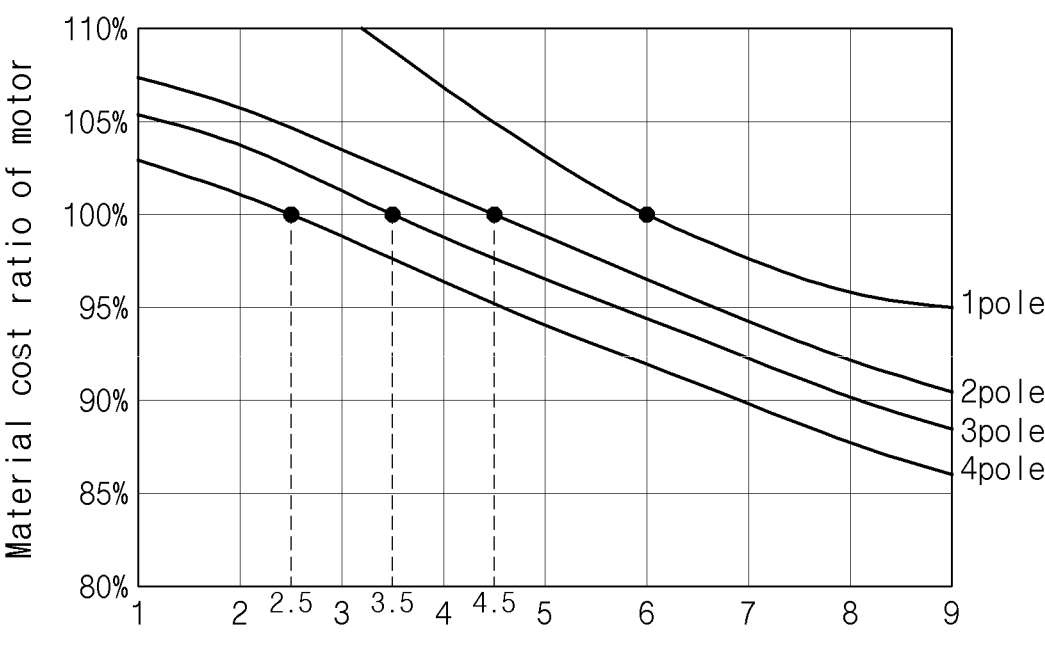
FIG. 17 is a graph illustrating a rate of change of material cost of an example of a motor with respect to a polar anisotropy coefficient of an example of a magnet.
Figure 18:
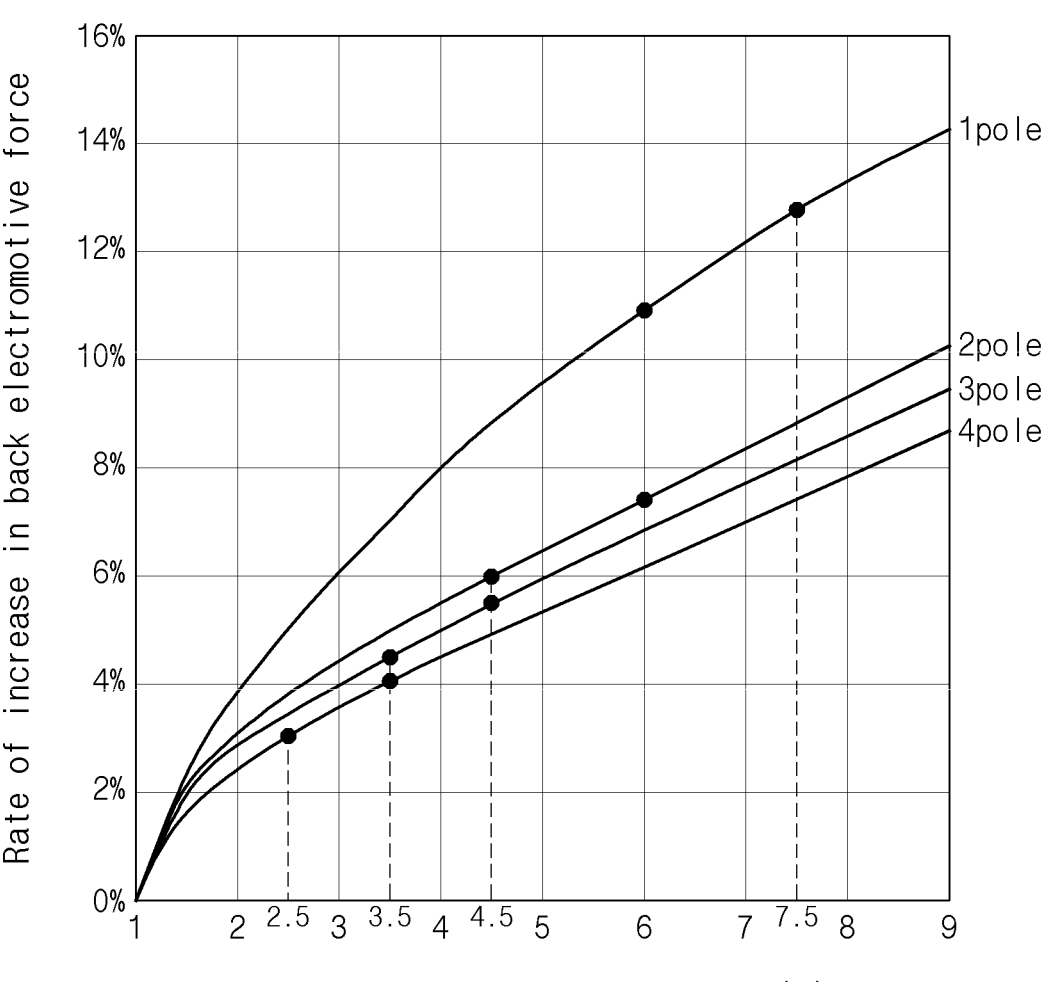
FIG. 18 is a graph illustrating a rate of increase in back electromotive force of an example of a motor with respect to a polar anisotropy coefficient of an example of a magnet.

FIG. 15 is a graph illustrating a rate of change of material cost of an example of a stator unit with respect to a polar anisotropy coefficient of an example of a magnet. FIG. 16 is a graph illustrating a manufacturing cost ratio of an example of a rotor with respect to the number of polar regions in an example of one magnet. FIG. 17 is a graph illustrating a rate of change of material cost of an example of a motor with respect to a polar anisotropy coefficient of an example of a magnet. FIG. 18 is a graph illustrating a rate of increase in back electromotive force of an example of a motor with respect to a polar anisotropy coefficient of an example of a magnet.

As illustrated FIG. 14, when the polar anisotropy coefficient (X) increases, the back electromotive force of the motors 150 and 160 can increase. In general, as a stacking height of the stator core in the same motor 160 decreases, the back electromotive force of the motor can decrease.

When increasing the polar anisotropy coefficient (X) to 1 or more, the polar anisotropy coefficient (X) can be set to a certain level based on the back electromotive force and the stacking height of the stator core. For example, when the polar anisotropy coefficient (X) is set to 1 or higher and the stacking height of the stator core is reduced, similar effect on the back electromotive force can be achieved as if the polar anisotropy coefficient (X) was 1. In other words, when the polar anisotropy coefficient (X) is set to 1 or more, it can have an effect of reducing the material cost of the stator unit by reducing the stacking height of the stator core.

Referring to FIG. 15, the graph illustrates that the material cost of the stator unit of the motors 150 and 160 decreases when the polar anisotropy coefficient (X) of the motors 150 and 160 increases. For example, when the polar anisotropy coefficient (X) increases, the back electromotive force of the motors 150 and 160 increases, and as illustrated in FIG. 15, the material cost of the stator unit can be reduced based on stacking of the stator units of the motors 150 and 160 being reduced. Here, the material cost ratio of the stator unit refers to a stator unit material cost (based on changed polar anisotropy coefficient (X)) compared to the stator unit material cost (based on the polar anisotropy coefficient (X) being set to 1).

Referring to FIG. 16, the graph illustrates the manufacturing cost ratio of the rotor 160 relative to the number of polar regions (1622, 1623, 1624, 1625, 1626, 1627, 1628, 1629, 1630, 1631, 1632) in a magnet. Here, the manufacturing cost ratio of the rotor 160 refers to the manufacturing cost of the rotor when the number of polar regions in one magnet 162 is less than 6 compared to the manufacturing cost of the rotor 160 when one magnet 162 consists of 6 polar regions.

Even if the number of polar regions (1622, 1623, 1624, 1625, 1626, 1627, 1628, 1629, 1630, 1631, 1632) of one magnet 162 can change in the rotor 160 of the same size, the overall mass of the magnets 162 in the rotor 160 does not change significantly.

However, as the number of polar regions (1622, 1623, 1624, 1625, 1626, 1627, 1628, 1629, 1630, 1631, 1632) in one magnet 162 increases, the number of magnets 162 in the rotor 160 decreases. As described above, for example, when the number of the polar regions 1622 and 1623 in one magnet 162 is 1, the number of physical magnets 162 of the rotor 160 can be 48. For example, when the number of the polar regions 1624 and 1625 in one magnet 162 is 2, the number of physical magnets 162 of the rotor 160 can be 24. For example, when the number of the polar regions 1626, 1627, and 1628 in one magnet 162 is 3, the number of physical magnets 162 of the rotor 160 can be 16. For example, when the number of the polar regions 1629, 1630, 1631, and 1632 in one magnet 162 is 4, the number of physical magnets 162 of the rotor 160 can be 12. For example, when the number of the polar regions in one magnet 162 is 6, the number of physical magnets 162 of the rotor 160 can be 8.

As the number of physical magnets 162 of the rotor 160 increases, the number of operations required to attach the magnets 162 to the inside of the rotor core 164 can increase, and thus the operation cost can increase. In other words, as the number of polar regions (1622, 1623, 1624, 1625, 1626, 1627, 1628, 1629, 1630, 1631, 1632) in one magnet 162 decreases, the manufacturing cost of the rotor 160 can increase.

Referring to FIG. 17, the graph illustrates the material cost ratio of the motors 150 and 160 relative to the polar anisotropy coefficient (X) of the magnet 162. For example, the material cost of the motors 150 and 160 can include the material cost of the stator unit described in FIG. 15 and the manufacturing cost of the rotor 160 described in FIG. 16.

Based on 100% material cost ratio of the motors 150 and 160 in FIG. 17, it can be seen that when the number of the polar regions 1622 and 1623 in one magnet 162 is 1, the polar anisotropy coefficient (X) can be 6, when the number of the polar regions 1624 and 1625 is 2, the polar anisotropy coefficient (X) can be 4.5, when the number of the polar regions 1626, 1627, and 1628 can be 3, the polar anisotropy coefficient (X) can be 3.5, and when the number of the polar regions 1629, 1630, 1631, and 1632 is 4, the polar anisotropy coefficient (X) can be 2.5.

Moreover, based on the material cost ratio of the motors 150 and 160 being reduced by less than 100%, the following is observed. For example, when the number of the at least one polar region 1622 and 1623 is 1, the polar anisotropy coefficient (X) exceeds 6, when the number of the at least one polar region 1624 and 1625 is 2, the polar anisotropy coefficient (X) can exceed 4.5. For example, when the number of the at least one polar region 1626, 1627, and 1628 is 3, the polar anisotropy coefficient (X) can exceed 3.5. For example, when the number of the at least one polar region 1629, 1630, 1631, and 1632 is 4, the polar anisotropy coefficient (X) can exceed 2.5. Such trend indicates the lowest threshold for setting the polar anisotropy coefficient (X) within the limited material cost of the motors 150 and 160.

Therefore, referring to FIG. 18, considering the limited material cost of the motors 150 and 160 without occurrence of cracks in the magnet 162, following design or orientation of the magnet 162 with optimal polar anisotropy coefficient (X) can be implemented. For example, when the number of the at least one polar region 1622 and 1623 is 1, the polar anisotropy coefficient (X) can be between 6 and 7.5. For example, when the number of the at least one polar region 1624 and 1625 is 2, the polar anisotropy coefficient (X) can be between 4.5 and 6. For example, when the number of the at least one polar region 1626, 1627, and 1628 is 3, the polar anisotropy coefficient (X) can be between 3.5 and 4.5. For example, when the number of the at least one polar region 1629, 1630, 1631, and 1632 is 4, the polar anisotropy coefficient (X) can be between 2.5 and 3.5.

What is claimed is:

1. A washing machine comprising:
   a motor comprising:
     a stator;
     a rotor including a rotor core disposed radially outside the stator; and
     a plurality of magnets that are disposed on an inner surface of the rotor core and that face the stator,
   wherein each of the plurality of magnets comprises:
     one or more polar regions each having an arc shape and arranged in a circumferential direction,
   wherein a magnetic focus center of each of the one or more polar regions is different from a center of an inner diameter of the one or more polar regions,
   wherein a value X that is obtained by dividing (i) $d_m$, a distance from a first straight line that connects a first end and a second end of a first magnetic center line of the one or more polar regions to a center of the first magnetic center line, by (ii) $d_b$, a distance from a second straight line that connects a first end and a second end of a second magnetic center line of the one or more polar regions to a center of the second magnetic center line, satisfies at least one of following values based on a number of the one or more polar regions:
     X<7.5 based on the number of the one or more polar regions being 1;
     X<6 based on the number being 2;
     X<4.5 based on the number being 3; or
     X<3.5 based on the number being 4, and
   wherein $d_b$ is determined based on the one or more polar regions having a magnetic focus center that corresponds to the center of the inner diameter.

2. The washing machine of claim 1, wherein $d_b$ satisfies the following equation:

$$d_b = \frac{r_i + r_o}{2} - \sqrt{\left(\frac{r_i + r_o}{2}\right)^2 - \left(\frac{r_o - r_i}{2p}\right)^2},$$

wherein $r_i$ corresponds to an inner radius of the one or more polar regions,
   wherein $r_o$ corresponds to an outer radius of the one or more polar regions, and
   wherein p corresponds to the number of the one or more polar regions.

3. The washing machine of claim 1, wherein the value X satisfies at least one of following values based on the number of the one or more polar regions:
     6<X<7.5 based on the number being 1;
     4.5<X<6 based on the number being 2;
     3.5<X<4.5 based on the number being 3; or
     2.5<X<3.5 based on the number being 4.

4. The washing machine of claim 1, wherein the one or more polar regions are provided in a plurality, and
   wherein distances from each magnetic focus center of each of the plurality of polar regions to each of the plurality of polar regions are equal.

5. The washing machine of claim 1, wherein the one or more polar regions are provided in a plurality, and
   wherein circumferential distances between adjacent magnetic focus centers of the plurality of polar regions are equal.

6. The washing machine of claim 1, wherein the stator comprises a plurality of stator teeth, and
   wherein the plurality of magnets that are disposed on an inner surface of the rotor core face the plurality of stator teeth.

7. A magnet comprising:
   one or more polar regions each having an arc shape and arranged in a circumferential direction,
   wherein a magnetic focus center of each of the one or more polar regions is different from a center of an inner diameter of the one or more polar regions,
   wherein a value X that is obtained by dividing (i) $d_m$, a distance from a first straight line that connects a first end and a second end of a first magnetic center line of the one or more polar regions to a center of the first magnetic center line, by (ii) $d_b$, a distance from a second straight line that connects a first end and a second end of a second magnetic center line of the one or more polar regions to a center of the second magnetic center line, satisfies at least one of following values based on a number of the one or more polar regions:
     X<7.5 based on the number of the one or more polar regions being 1,
     X<6 based on the number being 2,
     X<4.5 based on the number being 3, or
     X<3.5 based on the number being 4, and
   wherein $d_b$ is determined based on the one or more polar regions having a magnetic focus center that corresponds to the center of the inner diameter.

8. The magnet of claim 7, wherein $d_b$ satisfies the following equation:

$$d_b = \frac{r_i + r_o}{2} - \sqrt{\left(\frac{r_i + r_o}{2}\right)^2 - \left(\frac{r_o - r_i}{2p}\right)^2},$$

wherein $r_i$ corresponds to an inner radius of the one or more polar regions,
   wherein $r_o$ corresponds to an outer radius of the one or more polar regions, and
   wherein p corresponds to the number of the one or more polar regions.

9. The magnet of claim 7, wherein the value X satisfies at least one of following values based on the number of the one or more polar regions:
     6<X based on the number being 1;
     4.5<X based on the number being 2;
     3.5<X based on the number being 3; or
     2.5<X based on the number being 4.

10. The magnet of claim 7, wherein the one or more polar regions are provided in a plurality, and
   wherein distances from each magnetic focus center of each of the plurality of polar regions to each of the plurality of polar regions are equal.

11. The magnet of claim 7, wherein the one or more polar regions are provided in a plurality, and
   wherein circumferential distances between adjacent magnetic focus centers of the plurality of polar regions are equal.

12. The magnet of claim 7, wherein the one or more polar regions are provided in a plurality, and wherein neighboring polar regions of the plurality of polar regions have different polarities.

13. A magnet comprising:

one or more polar regions each having an arc shape and arranged in a circumferential direction, wherein a magnetic focus center of each of the one or more polar regions is different from a center of an inner diameter of the one or more polar regions, wherein a value X that is obtained by dividing (i) $d_m$, a distance from a first straight line that connects a first end and a second end of a first magnetic center line of the one or more polar regions to a center of the first magnetic center line, by (ii) $d_b$, a distance from a second straight line that connects a first end and a second end of a second magnetic center line of the one or more polar regions to a center of the second magnetic center line, satisfies at least one of following values based on a number of the one or more polar regions:

6<X based on the number of the one or more polar regions being 1, 4.5<X based on the number being 2, 3.5<X based on the number being 3, or 2.5<X based on the number being 4, and wherein $d_b$ is determined based on the one or more polar regions having a magnetic focus center that corresponds to the center of the inner diameter.

14. The magnet of claim 13, wherein $d_b$ satisfies the following equation:

$$d_b = \frac{r_i + r_o}{2} - \sqrt{\left(\frac{r_i + r_o}{2}\right)^2 - \left(\frac{r_o - r_i}{2p}\right)^2},$$

wherein $r_i$ corresponds to an inner radius of the one or more polar regions, wherein $r_o$ corresponds to an outer radius of the one or more polar regions, and wherein p corresponds to the number of the one or more polar regions.

15. The magnet of claim 13, wherein the one or more polar regions are provided in a plurality, and wherein distances from each magnetic focus center of each of the plurality of polar regions to each of the plurality of polar regions are equal.

16. The magnet of claim 13, wherein the one or more polar regions are provided in a plurality, and wherein circumferential distances between adjacent magnetic focus centers of the plurality of polar regions are equal.

17. The magnet of claim 13, wherein the one or more polar regions are provided in a plurality, and wherein neighboring polar regions of the plurality of polar regions have different polarities.

18. A motor comprising:

a stator;

a rotor including a rotor core disposed radially outside the stator; and a plurality of magnets that are disposed on an inner surface of the rotor core and that face the stator, wherein each of the plurality of magnets comprises:

one or more polar regions each having an arc shape and arranged in a circumferential direction, wherein a magnetic focus center of each of the one or more polar regions is different from a center of an inner diameter of the one or more polar regions, wherein a value X that is obtained by dividing (i) $d_m$, a distance from a first straight line that connects a first end and a second end of a first magnetic center line of the one or more polar regions to a center of the first magnetic center line, by (ii) $d_b$, a distance from a second straight line that connects a first end and a second end of a second magnetic center line of the one or more polar regions to a center of the second magnetic center line, satisfies at least one of following values based on a number of the one or more polar regions:

X<7.5 based on the number of the one or more polar regions being 1;

X<6 based on the number being 2;

X<4.5 based on the number being 3; or

X<3.5 based on the number being 4, and wherein $d_b$ is determined based on the one or more polar regions having a magnetic focus center that corresponds to the center of the inner diameter.

19. The motor of claim 18, wherein:

based on a number of the one or more polar regions being 1, a number of the plurality of magnets is 48;

based on the number of the one or more polar regions being 2, the number of the plurality of magnets is 24;

based on the number of the one or more polar regions being 3, the number of the plurality of magnets is 16; and based on the number of the one or more polar regions being 4, the number of the plurality of magnets is 12.

* * * * *